(12) United States Patent
Carnevale

(10) Patent No.: US 7,028,930 B2
(45) Date of Patent: Apr. 18, 2006

(54) KITCHEN APPLIANCE WITH A SAFETY INTERLOCK

(75) Inventor: Francesco Leopoldo Carnevale, Glen Allen, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 134 days.

(21) Appl. No.: 10/782,616

(22) Filed: Feb. 19, 2004

(65) Prior Publication Data
US 2005/0185509 A1    Aug. 25, 2005

(51) Int. Cl.
   *B02C 23/00*   (2006.01)
   *B02C 1/08*    (2006.01)
   *B02C 13/28*   (2006.01)
   *B02C 17/02*   (2006.01)

(52) U.S. Cl. ............... 241/37.5; 241/278.1; 241/282.1; 241/92

(58) Field of Classification Search ............... 241/37.5, 241/278.1, 282.1, 282.2, 91, 92; 99/492, 99/510, 511
See application file for complete search history.

(56) References Cited

U.S. PATENT DOCUMENTS

| | | | |
|---|---|---|---|
| 2,462,105 A | 2/1949 | Kobey |
| 2,678,073 A | 5/1954 | DeNardis |
| 3,085,607 A | 4/1963 | Schottle |
| 3,892,365 A | 7/1975 | Verdun |
| 3,985,304 A | 10/1976 | Sontheimer |
| 4,143,824 A | 3/1979 | Shiotani |
| 4,216,917 A | 8/1980 | Clare et al. |
| 4,227,655 A | 10/1980 | Williams |
| 4,269,519 A | 5/1981 | Birr |
| 4,297,038 A | 10/1981 | Falkenbach |
| 4,316,584 A | 2/1982 | Valbona |
| 4,325,643 A | 4/1982 | Scott et al. |
| 4,369,680 A | 1/1983 | Williams |
| 4,371,118 A | 2/1983 | Sontheimer et al. |
| 4,393,737 A | 7/1983 | Shibata |
| 4,396,159 A | 8/1983 | Podell |
| 4,448,100 A | 5/1984 | Breeden |
| 4,456,184 A | 6/1984 | Williams et al. |
| 4,458,848 A | 7/1984 | Williams |
| 4,506,836 A | 3/1985 | Williams |

(Continued)

*Primary Examiner*—Faye Francis
(74) *Attorney, Agent, or Firm*—Akin Gump Strauss Hauer & Feld, LLP

(57) ABSTRACT

A kitchen appliance with a safety interlock for processing foodstuff includes a housing with a drive shaft extending therefrom. The drive shaft is rotatable about a drive axis and at least one portion of the drive shaft is movable along the drive axis between an extended position and a retracted position. A switch is supported in the housing and a bowl is removably mountable to the housing. The bowl includes a mouth and the drive shaft extends into the bowl when the bowl is secured to the housing in a working position. A bowl lid is removable mountable over the mouth of the bowl. The bowl lid is in a working position when it is mounted over the bowl when the bowl is in the working position. The bowl lid includes a lid shaft extending from the bowl lid that is in an operative relationship with the drive shaft when the bowl and bowl lid are in the working position. The lid shaft urges the at least one portion of the drive shaft into the retracted position when the lid shaft is in an operative position. The at least one portion of the drive shaft closes the switch in a retracted position such that power is able to be provided to the kitchen appliance.

24 Claims, 7 Drawing Sheets

U.S. PATENT DOCUMENTS

| | | |
|---|---|---|
| 4,512,522 A | 4/1985 | Williams |
| 4,523,720 A | 6/1985 | Behringer et al. |
| 4,540,128 A | 9/1985 | Breeden |
| 4,544,103 A | 10/1985 | Breeden |
| 4,589,599 A | 5/1986 | Williams |
| 4,614,306 A | 9/1986 | Doggett |
| 4,623,097 A | 11/1986 | Sontheimer |
| 4,629,131 A | 12/1986 | Podell |
| 4,674,690 A | 6/1987 | Ponikwia et al. |
| 4,700,901 A | 10/1987 | McClean |
| 4,706,896 A | 11/1987 | Moon-Kau |
| 4,741,482 A * | 5/1988 | Coggiola et al. .......... 241/37.5 |
| 4,819,882 A | 4/1989 | Stottmann et al. |
| 4,824,029 A | 4/1989 | Stottmann et al. |
| 5,037,033 A | 8/1991 | Stottmann et al. |
| 5,257,575 A | 11/1993 | Harrison et al. |
| 5,355,784 A | 10/1994 | Franklin et al. |
| 5,395,060 A | 3/1995 | Hackel et al. |
| 5,417,152 A | 5/1995 | Harrison |
| 5,445,070 A | 8/1995 | Rebel |
| 5,486,665 A * | 1/1996 | Le Rouzic ................ 200/302.2 |
| 5,921,485 A | 7/1999 | Plavcan et al. |
| 6,209,810 B1 * | 4/2001 | Brisard ....................... 241/37.5 |
| 6,397,735 B1 | 6/2002 | Wong |
| 6,418,837 B1 | 7/2002 | Obersteiner |
| 6,510,784 B1 | 1/2003 | Fevre et al. |
| 6,640,693 B1 | 11/2003 | Brezovnik et al. |
| 6,669,124 B1 * | 12/2003 | Lazzer et al. ................. 241/36 |
| 6,907,819 B1 * | 6/2005 | Kernan ........................ 99/492 |
| 2003/0066438 A1 | 4/2003 | Brezovnik et al. |
| 2003/0070564 A1 | 4/2003 | Pavlovic et al. |

* cited by examiner

KITCHEN APPLIANCE WITH A SAFETY INTERLOCK

BACKGROUND OF THE INVENTION

The present application is directed to a kitchen appliance with a safety interlock and, more particularly, to a safety interlock comprised of at least one portion of a drive shaft of the kitchen appliance that is movable.

Kitchen appliances commonly include a motor housing with a motor positioned therein, a bowl that is removably mountable to the motor housing and a lid that is removably mountable over a mouth of the bowl. A drive shaft extends from the motor housing into the bowl when the bowl is mounted to the motor housing. The drive shaft is rotatably driven by the motor and a processing tool is removably securable to the drive shaft for processing foodstuff within the bowl. During operation, a number of safety interlocks have been developed that prevent a user's hands from coming into contact with the processing or cutting tool when the bowl is mounted to the housing and the bowl lid is mounted to the bowl.

Prior safety interlocks may include a tab on the bowl lid that extends into a slot in the motor housing to close a switch that enables power to be provided to the motor only when the bowl and bowl lid are properly mounted. The motor housing in these side-by-side kitchen appliances extends upwardly from its base along a side of the bowl. The kitchen appliance is assembled such that a user's hand is unable to enter the processing space within the bowl when the switch is closed and the appliance is operational. The prior art side-by-side processors require the additional vertical portion of the motor housing that extends upwardly from the base of the motor housing. A tab extends from a rim of the bowl lid that extends into a slot in the side of the vertical section of the motor housing to actuate a switch within the vertical section of the motor housing. Because of this configuration, the bowl and bowl lid must be mounted in one operating position relative to the motor housing such that the tab enters the slot. The side-by-side kitchen appliance also tends to take up a relatively large amount of counter space in a kitchen.

An alternate safety interlock for a kitchen appliance may include a switch mounted in the motor housing and a movable shaft located adjacent a handle of the bowl. The movable shaft is movable between an extended and a retracted position. The bowl lid includes a tab that engages an end of the movable shaft when the bowl lid is mounted to the bowl to move the shaft to the retracted position. When the bowl is secured to the motor housing and the lid is secured to the bowl, the movable shaft is positioned in its retracted position and its end adjacent the motor housing closes the switch such that power is provided to the motor. This type of kitchen appliance is often referred to as a bowl over motor appliance or processor. In contrast to the side-by-side appliance, the bowl over motor processor generally takes up less counter space in the kitchen. However, prior bowl over motor housing kitchen appliances require the additional movable shaft located in the bowl, which complicates construction of the bowl and requires the addition of the movable shaft adjacent a periphery of the bowl or within the handle of the bowl.

The preferred embodiment of the safety interlock for a kitchen appliance in accordance with the present application includes a drive shaft with at least one portion that is movable along a drive axis between the extended and retracted positions. In the retracted position, the at least one portion of the drive shaft or drive pin in the preferred embodiment closes a switch that enables power to be provided to the motor. The drive pin is moved to the retracted position only when the bowl and lid are mounted to the motor housing in a working position. Accordingly, the safety switch is only closed when a user's hand cannot come into contact with a rotating tool within the bowl. The inclusion of the movable drive pin eliminates the complicated construction of the bowl and need for an extra shaft adjacent the handle of the bowl. In addition, the preferred kitchen appliance with the safety interlock of the present application retains the space saving advantages of the bowl over motor type kitchen appliance.

BRIEF SUMMARY OF THE INVENTION

A preferred embodiment of the present application comprises a kitchen appliance with a safety interlock for processing foodstuff. The device includes a housing with a drive shaft extending therefrom. The drive shaft is rotatable about a drive axis and at least one portion of the drive shaft is movable along the drive axis between an extended position and a retracted position. The kitchen appliance includes a switch supported within the housing and a bowl including a mouth. The bowl is removably mountable to the housing. The drive shaft extends into the bowl when the bowl is secured to the housing in a working position. A bowl lid is removably mountable over the mouth of the bowl. The bowl lid is in a working position when it is mounted over the bowl and the bowl is in the working position. A lid shaft is mounted on the bowl lid and is in an operative relationship with the drive shaft when the bowl and bowl lid are in the working position. The lid shaft urges the at least one portion of the drive shaft into the retracted position when the lid shaft is in an operative position. The at least one portion of the drive shaft closes the switch in the retracted position such that power is able to be provided to the kitchen appliance.

In another aspect, a preferred embodiment of the present application is directed to a kitchen appliance with a safety interlock for processing foodstuff. The kitchen appliance includes a housing with a motor therein. The motor includes a motor shaft that rotatably drives a drive shaft. The drive shaft extends from the housing along a drive axis. A drive pin comprises at least a portion of the drive shaft. The drive pin is movable along the drive axis between a retracted position and an extended position. A switch is positioned in the housing and is in an operative relationship with the motor. A bowl includes a mouth and is removably mountable to the housing such that the drive shaft extends into the bowl in a working position. A bowl lid is removably mountable over a mouth of the bowl and is mounted to a mouth of the bowl when the bowl and bowl lid are in the working position. The bowl lid includes a feed tube that extends from a top bowl lid wall and a feed mouth. A lid shaft is movably mounted to the feed tube and is movable between an operative position and a safety position. A feed tube lid is movably mounted to the feed tube adjacent the feed mouth and covers at least a portion of the feed tube mouth in a closed position. The feed tube lid includes a tab extending therefrom that urges the lid shaft into the safety position and the lid shaft urges the drive pin into the retracted position to close the switch and enable electric power to flow to the motor when the feed tube lid is in the closed position, the lid shaft is in the operative position, the drive pin is in the retracted position and the bowl and bowl lid are in the working position.

In another aspect, a preferred embodiment of the present application is directed to a safety interlock for a kitchen appliance that renders the kitchen appliance inoperative when the safety interlock is in an open position. The kitchen appliance includes an electric motor mounted within a housing. A switch is mounted within the housing and power is able to be provided to the motor when the switch is closed. A drive shaft is driven by the motor and extends from the housing along a drive axis. The drive shaft includes a drive sleeve and a drive pin. The drive pin is movably mounted to the drive sleeve and is movable along the drive axis between an extended position and a retracted position. The switch is closed when the drive pin is in the retracted position. A bowl is removably mountable to the housing and a bowl lid is removably mountable over the mouth of the bowl. The bowl lid includes a lid shaft mounted thereto. The lid shaft contacts the drive pin and moves the drive pin to the retracted position when the lid shaft is in an operative position and the bowl and bowl lid are in a working position.

In yet another aspect, a preferred embodiment of the present application is directed to a kitchen appliance with a safety interlock for processing foodstuff. The kitchen appliance includes a housing and a motor mounted within the housing. The motor includes a drive shaft that extends out of the housing and at least one portion of the drive shaft is movable along a drive axis. A switch is mounted in the housing and a bowl is removably mountable to the housing such that the drive shaft extends into the bowl in a working position. A lid is removably mountable over a mouth of the bowl. One of the lid and bowl actuate the at least one portion of the drive shaft to close the switch such that power is able to be provided to the motor when the bowl is in the working position and the lid is mounted over the bowl.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment that is presently preferred. It should be understood, however, that the application is not limited to the precise arrangements and instrumentalities shown. In the drawings.

DETAILED DESCRIPTION OF THE INVENTION

Figure 1:
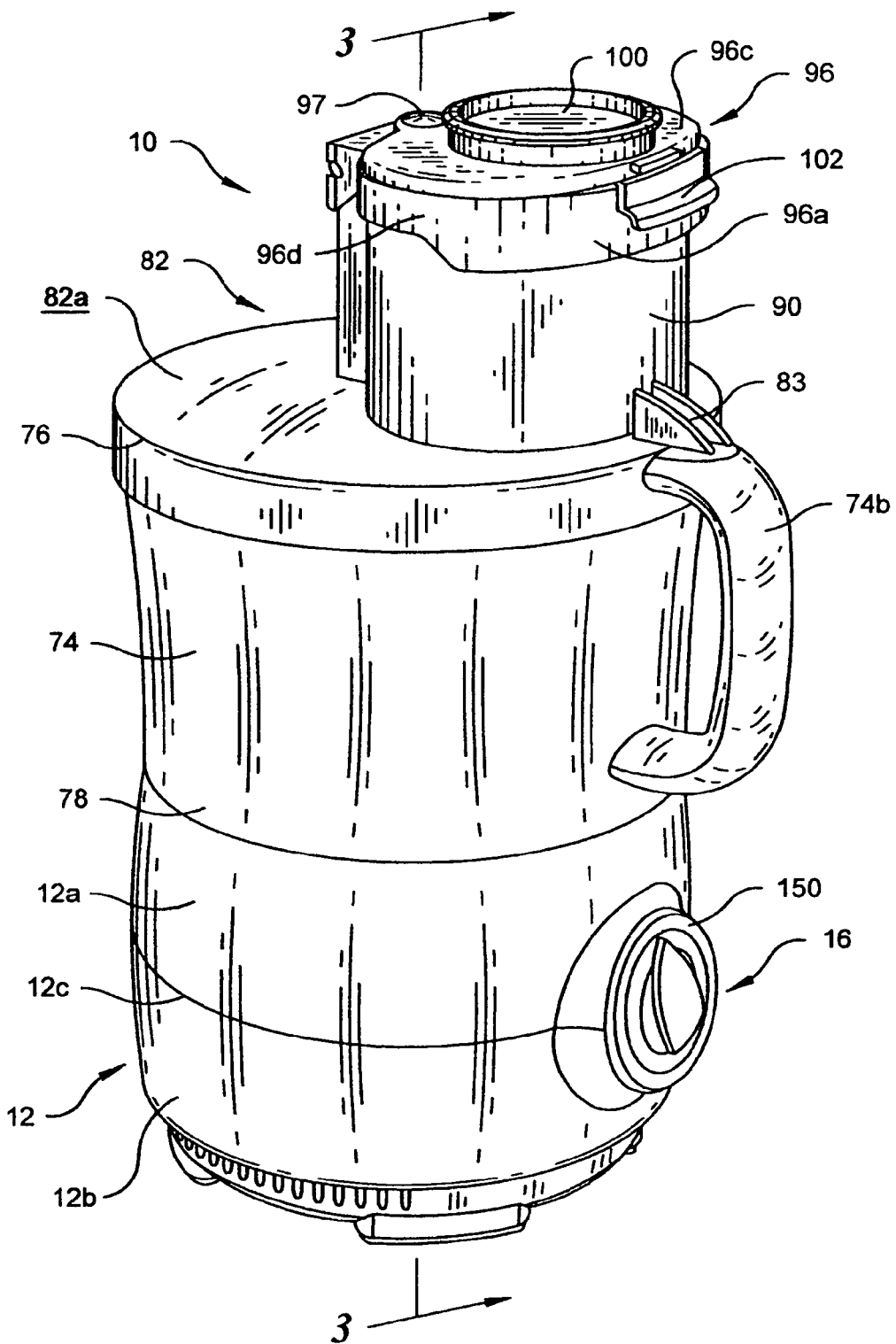
FIG. 1 is a top perspective view of a kitchen appliance with a safety interlock in accordance with a preferred embodiment of the present application.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the preferred kitchen appliance and designated parts thereof. The terminology includes the above-listed words, derivatives thereof and words of similar import.

Referring to the drawings in detail, wherein like numerals indicate like elements throughout, there is shown in FIGS. 1–5, a preferred embodiment of a kitchen appliance 10 with a safety interlock for processing foodstuff, in accordance with the present application.

Figure 2A:
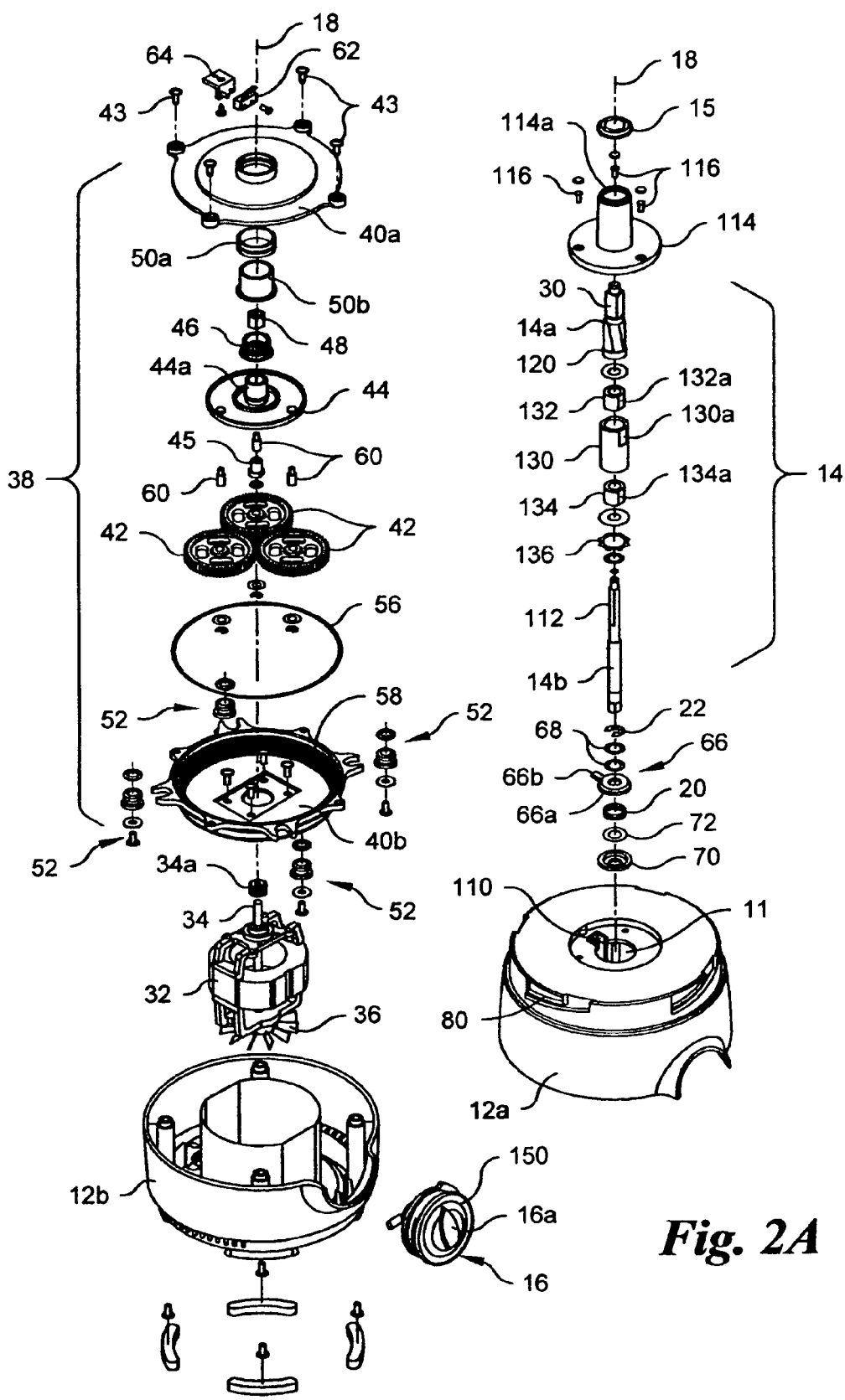
FIG. 2A is an exploded perspective view of the motor housing and drive shaft of the kitchen appliance shown in FIG. 1.
Figure 3A:
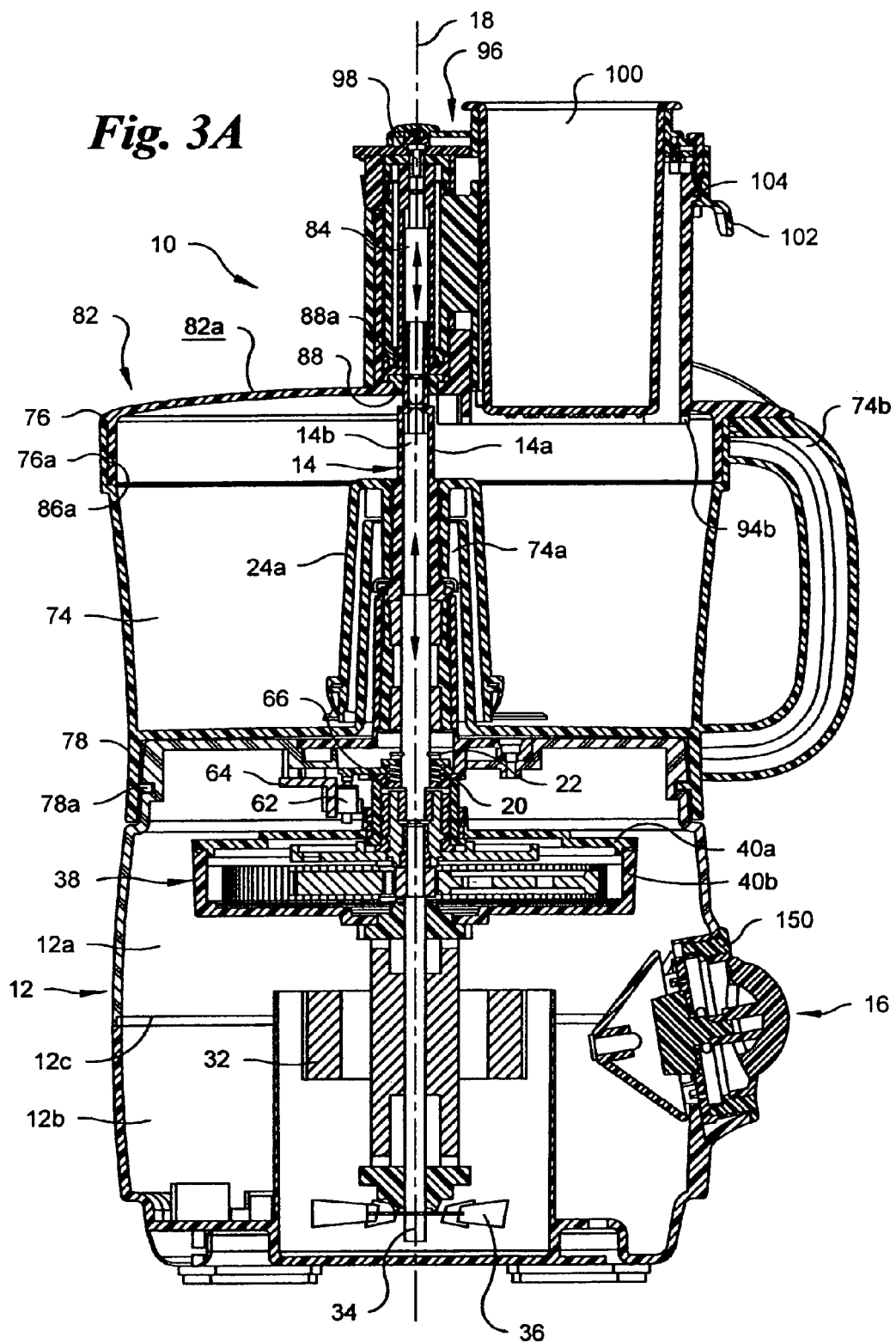
FIG. 3A is a cross-sectional view of the kitchen appliance shown in FIG. 1, taken along line 3—3 of FIG. 1.

Referring to FIGS. 1, 2A and 3A, in the preferred embodiment, the kitchen appliance 10 of the present application includes a housing 12 with a drive shaft 14 extending therefrom. Preferably, the housing 12 has a generally cylindrical shape that is preferably closed at both ends and is constructed of an upper shell 12a and a lower shell 12b. The housing 12 is not limited to generally cylindrical configurations and may take on nearly any shape that enables the housing 12 to perform its intended functions as will be described in greater detail below. For example, the housing 12 may have a generally cubic shape.

The upper and lower shells 12a, 12b are preferably constructed of an injection molded acrylonitrile butadiene styrene (ABS) material. The housing 12 is not limited to the injected molded ABS materials and may be constructed of nearly any generally rigid material that is able to take on the general shape of the upper and lower shells 12a, 12b or the entire housing 12 and perform the functions of the housing 12 as will be described in greater detail below. For example, the housing 12 may be constructed of a polymeric, metal or like material. The ABS material is preferred due to its relatively smooth surface finish, ability to readily take on various colors and high impact and crack resistance.

In the preferred embodiment, the upper and lower shells 12a, 12b have generally cup-shapes and are joined together at a parting line 12c. The upper and lower shells 12a, 12b accommodate a control mechanism 16 that is fixed to a side wall of the housing 12 between the shells 12a, 12b at the parting line 12c. The control mechanism 16 is used to control the operation of the kitchen appliance 10. The upper and lower shells 12a, 12b are preferably secured together by a snap-fit at the parting line 12c. The upper and lower shells 12a, 12b are not limited to a snap-fit and may be adhesively bonded, bolted, riveted or otherwise secured to each other to form the housing 12. In addition, the housing 12 is not limited to constructions including the upper and lower shells 12a, 12b. For example, the housing 12 may be integrally molded as a single piece or may be constructed of any number of sections that are secured together to form the housing 12. However, it is preferable that the housing 12 is constructed of the upper and lower shells 12a, 12b to minimize part count, simplify assembly and to accommodate the insertion components of the kitchen appliance 10 therein.

Referring to FIG. 1, the control mechanism 16 is preferably a rotary electric switch with at least one momentary switch position. Specifically, the preferred control mechanism 16 includes a dial 16a on its front that is rotatable in clockwise and counter clockwise directions. When the dial 16a is rotated in the counter clockwise direction, the kitchen appliance 10 operates momentarily while the dial 16a is held in this pulse position an stops operating when the dial 16a is released. The dial 16a is biased to move to an off or start position where the dial 16a is preferably oriented generally vertically with respect to the housing 12 (FIGS. 1 and 2). In addition, the control mechanism 16 includes a plurality of speeds in the preferred embodiment that may be selected by rotating the dial 16a in a clockwise direction. The kitchen appliance 10 is not limited to the above-described control mechanism 16 and may include nearly any control mechanism that would be obvious to one having ordinary skill in the art. The preferred control mechanism 16 operates and is constructed in essentially the same manner as the switch disclosed in U.S. Pat. No. 5,967,304, which is incorporated herein by reference.

Referring to FIGS. 2A and 3A–4, the drive shaft 14 of the kitchen appliance 10 is rotatable about a drive axis 18 and at least one portion of the drive shaft 14 is movable along the drive axis 18 between an extended position and a retracted position. In the preferred embodiment, the drive shaft 14 includes a hollow drive sleeve 14a and a drive pin 14b. The drive sleeve 14a is preferably open at both ends and accommodates the drive pin 14b therein. The drive sleeve 14a is preferably constructed of an injection molded polymeric material and includes a square male coupling 30 on its upper end. The drive sleeve 14a is not limited to constructions including the injection molded polymeric material or to the inclusion of the square male coupling 30. The drive sleeve 14a may be constructed of nearly any rigid material that is able to take on the general shape of the drive sleeve 14a and withstand the normal operating conditions of the drive sleeve 14a. For example, the drive sleeve 14a may be constructed of a machined metallic or like material.

The drive pin 14b preferably has a generally stepped, cylindrical shape and is solid. The drive pin 14b is preferably constructed of a machined metallic material. Metallic constructions of the drive pin 14b are preferred for toughness and durability for transferring rotation between the drive pin 14b and a gear reduction mechanism 38, which will be described in greater detail below. In addition, the preferred metallic material is corrosion resistant, which is preferred for kitchen appliance applications. The drive pin 14b is not limited to metallic constructions and may be constructed of nearly any material and take on nearly any shape that accommodates the normal operating conditions of the drive pin 14b. For example, the drive pin 14b may be constructed in a rectangular shape from a polymeric material.

In the preferred embodiment, the drive pin 14b is movable between the extended position (FIG. 4) and the retracted position (FIG. 3A). Preferably, the drive pin 14b is spring biased toward the extended position by a drive spring 20. However, the drive pin 14b is not limited to being biased toward the extended position by the drive spring 20. For example, the drive pin 14b may be biased toward the extended position by a flexible cushion or may not be biased at all. However, the drive pin 14b is preferably biased toward the extended position such that the kitchen appliance 10 does not operate unless the drive pin 14b is moved to the retracted position (as will be described in greater detail below).

In the preferred embodiment, the drive spring 20 is comprised of a compression spring that acts between the housing 12 and a drive e-clip 22 that is secured to the drive pin 14b adjacent its lower end. The drive spring 20 applies a separating force between the drive e-clip 22 and the housing 12 to bias the drive pin 14b toward the extended position. Preferably, the drive spring 20 biases the drive pin 14b to the extended position where an end of the drive pin 14b opposite the drive e-clip 22 is positioned slightly below an upper open end of the hollow drive sleeve 14a. The drive e-clip 22 preferably also limits the upward movement of the drive pin 14b at the extended position when it comes into contact with a lower end of a drive shaft housing 114, which will be described in greater detail below.

Referring to FIGS. 2A–4, in the preferred embodiment, a tool 24 is removably mountable to the hollow drive sleeve 14a. The tool 24 of the preferred kitchen appliance 10 comprises at least an S-blade tool 24a and a slicer/shredder disc 24b. The S-blade tool 24a is preferably used to chop foodstuff within the bowl and the slicer/shredder disc 24b is preferably used to slice foodstuff using a first surface 26a and to shred foodstuff using a second surface (not shown). The kitchen appliance 10 is not limited to the disclosed S-blade tool 24a and slicer/shredder disc 24b and may incorporate nearly any tool that is utilized in a kitchen appliance 10 to process foodstuff. For example, the kitchen appliance 10 may incorporate a juicing tool, a dicing tool or like foodstuff processing tools that are generally well known to those having ordinary skill in the art.

The processing tool 24 is preferably removable from and rotatably mountable to the hollow drive sleeve 14a such that the hollow drive sleeve 14a may drive the tool 24 in rotation when it is mounted thereto. The tool 24 is rotatably mounted to the hollow drive sleeve 14a in the preferred embodiment by a square female coupling 28 on the tool 24 that engages the square male coupling 30 on the upper surface of the hollow drive sleeve 14a. The tool 24 is not limited to being rotatably coupled to the hollow drive sleeve 14a. For example, the tool 24 may be rotatably coupled to the drive pin 14b or to any other portion of the drive shaft 14 that drives the tool 24 when the drive shaft 14 rotates.

Referring to FIGS. 2A and 3A–4, an electric motor 32 is preferably mounted within the housing 12. The motor 32 includes a motor shaft 34 with a cooling fan 36 on a lower end of the motor shaft 34. The motor 32 is preferably bolted to the lower shell 12b such that it is fixed within the housing 12 in an assembled condition. The motor 32 may be comprised of nearly any device that is able to withstand the normal operating conditions of the motor 32, fit within the housing 12 and provide a rotational motion to the drive shaft 14 for processing foodstuff using the kitchen appliance 10.

In the preferred embodiment, the drive pin 14b is rotatably driven by a gear reduction mechanism 38, which is rotatably driven by the motor shaft 34. The gear reduction mechanism 38 is preferably a twelve to one gear reducer that reduces the output rotational speed from the motor shaft 34. The gear reduction mechanism 38 is not limited to the twelve to one gear reduction ratio and is not limited to inclusion in the kitchen appliance 10 at all. However, the gear reduction mechanism 38 is preferred to provide a preferred rotational speed to the tool 24, which may be variable.

Referring to FIG. 2A, in the preferred embodiment, the gear reduction mechanism 38 includes a gear box with a first plate 40a and a second plate 40b, a plurality of planet gears 42 that are mounted to the second plate 40b, a planet gear plate 44 including a neck 44a that is rotatably driven by the planet gears 42, a motor shaft bushing 45 mounted within a lower end of the neck 44a, a planet gear plate bushing 46 mounted to an outside of the neck 44a, a drive shaft insert coupling 48 mounted within an upper end of the neck 44a, a gear box bushing 50a that is mounted to the first plate 40a and a gear box bushing sleeve 50b that is mounted to the gear box bushing 50a. The gear reduction mechanism 38 is mounted in the housing 12 by a plurality of gear box fasteners and washers 52. The gear box is preferably constructed of the first and second plates 40a, 40b secured together by a second set of fasteners 43 that fix the first and second plates 40a, 40b together with an O-ring 56 positioned therebetween to seal any lubricating fluid within the gear box. Each of the components of the gear reduction mechanism 38 is preferably at least partially positioned within the gear box.

Figure 3B:
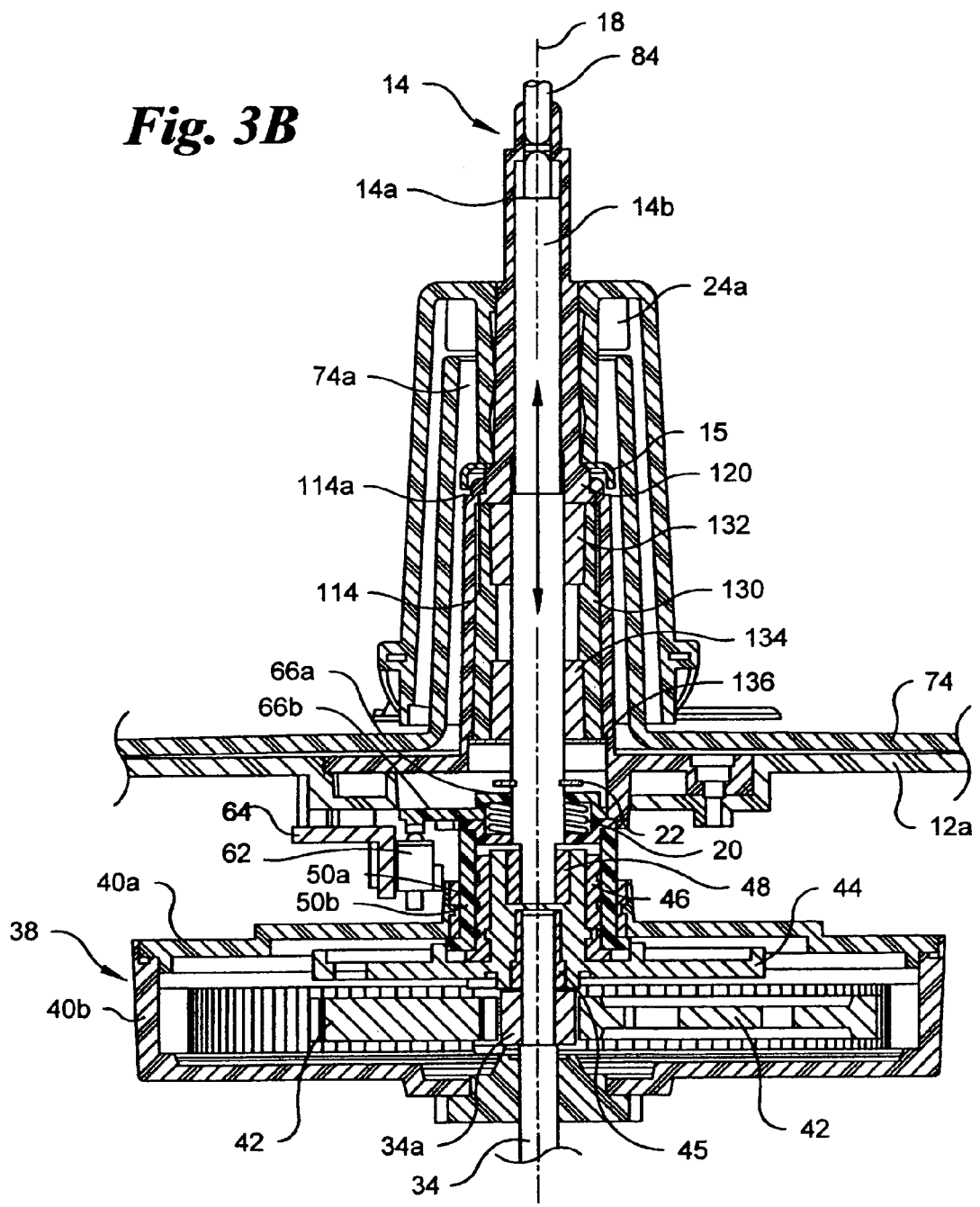
FIG. 3B is an enlarged, partial cross-sectional view of a portion of the safety interlock of the kitchen appliance shown in FIG. 1, taken along line 3—3 of FIG. 1.

Referring to FIGS. 2A and 3B, in the preferred embodiment, the planet gear plate 44 is constructed of an injection molded polymeric material. The drive shaft insert coupling 48 and motor shaft bushing 45 are fixedly mounted within an inner diameter of the neck 44a of the planet gear plate 44 and are both constructed of a metallic material. The drive shaft insert coupling 48 transmits rotational motion between the neck 44a and the drive pin 14b and is constructed of a metallic material to protect the polymeric planet gear plate 44 from coupling directly to the metallic drive pin 14b. The motor shaft bushing 45 aids in aligning the motor shaft 34 with the drive pin 14b and protects the polymeric planet gear plate 44 from the rotating motor shaft 34. The planet gear plate bushing 46 is rotatably coupled to an outside of the neck 44a and is preferably constructed of a metallic material. The planet gear plate bushing 46 protects the outside surface of the polymeric neck 44a from rotatable contact with the preferably stationary and metallic gear box bushing sleeve 50b, which is mounted to the first plate 40a by the preferably metallic gear box bushing 50a. The metallic drive shaft insert coupling 48, motor shaft bushing 45 and planet gear plate bushing 46 are preferred to protect the polymeric planet gear plate 44 from coming directly into direct rotatable contact with the motor shaft 34, drive pin 14b and gear box bushing sleeve 50b, because polymeric materials generally do not structurally hold up to direct rotatable contact or coupling with metallic parts. However, the planet gear plate 44 is not limited to being constructed of a polymeric material and the drive shaft insert coupling 48, motor shaft bushing 45 and planet gear plate bushing 46 are not limited to being constructed of metallic materials. The planet gear plate 44, drive shaft insert coupling 48, motor shaft bushing 45 and planet gear plate bushing 46 may be constructed of nearly any material that can take on the general shape of these components and withstand the normal operating conditions of these components.

In the preferred embodiment, the motor shaft 34 rotatably drives the gear reduction mechanism 38 through a motor gear 34a that is positioned within the gear box in an assembled condition and engages the planet gears 42 at a center thereof. The motor shaft 34 preferably extends through the motor gear 34a into the motor shaft bushing 45 to aid in aligning the motor shaft 34 with the planet gear plate 44 and drive pin 14b. The planet gears 42 are driven by the motor gear 34a to walk around the inside of a sun gear 58 that is formed on an inner surface of the second plate 40b. The sun gear 58 is not limited to being formed on an inner surface of the second plate 40b and may be formed on an inner surface of the first plate 40a or may be completely independent from the gear box. As the planet gears 42 walk about the inside of the sun gear 58, planet gear shafts 60 rotate about the drive axis 18. The planet gear shafts 60 are secured to the planet gear plate 44 and drive the planet gear plate 44 to rotate about the drive axis 18. The planet gear plate 44 is rotatably coupled to the drive shaft insert coupling 48 and drives the drive shaft insert coupling 48 to rotate about the drive axis 18. The drive shaft insert coupling 48 is rotatably coupled to the drive pin 14b and drives the drive pin 14b to rotate about the drive axis 18. The drive pin 14b is rotatably coupled to the tool 24 in the working position and drives the tool 24 to rotate about the drive axis 18 for processing foodstuff within the bowl 74. The kitchen appliance 10 is not limited to the above-described drive mechanism and may be constructed of nearly any drive mechanism that rotatably drives the tool 24 for processing foodstuff within the bowl 74.

Referring to FIGS. 2A and 3A–4, a switch 62 is supported within the housing 12. In the preferred embodiment, the switch 62 is mounted to a bracket 64 that is in turn mounted to an underside of the upper shell 12a. Preferably, the bracket 64 is mounted to the upper shell 12a by at least one screw and the switch 62 is mounted to the bracket 64 by at least one screw. The bracket 64 and switch 62 are not limited to being mounted to the bracket 64 or upper shell 12a by screws but may be secured to the bracket 64 or upper shell 12a by riveting, adhesive bonding or other methods that are obvious to one having ordinary skill in the art. In addition, the switch 62 is not limited to being secured to the housing 12 through the bracket 64 and may be directly secured to the housing 12 or may be secured to the housing 12 using various other components that would be obvious to one having ordinary skill in the art.

In the preferred embodiment, the switch 62 is comprised of a momentary switch 62. When the switch 62 is closed, electric energy flows through the switch 62 and power is able to be provided to the motor 32. However, when the switch 62 is open, electric energy does not flow through the switch 62 and power is not provided to the motor 32. The switch 62 is not limited to momentary switches and may be comprised of nearly any type of electric switch that opens or closes an electrical circuit prompted by an external actuation.

Referring to FIGS. 2A and 3B, in the preferred embodiment, a switch arm 66 is mounted to an end of the drive pin 14b within the housing 12. The switch arm 66 is preferably an injection molded polymeric construction that includes a central ring 66a and an arm protrusion 66b that extends outwardly from the central ring 66a. The switch arm 66 is not limited to polymeric constructions and may be constructed of nearly any material that is able to take on a generally shape of the switch arm 66 and withstand the normal operating conditions of the switch arm 66. In addition, the switch arm 66 is not limited to configurations including a central ring 66a and an arm protrusion 66b. For example, the switch arm 66 may be comprised of a protrusion that extends from the drive pin 14b or a ring that surrounds the drive pin.

The switch arm 66 is preferably mounted to the drive pin 14b such that it closes the switch 62 when the drive pin 14b is in the retracted (downward) position. The switch arm 66 is preferably non-rotatably mounted to the lower end of the drive pin 14b. In the preferred embodiment, the switch arm 66 is sandwiched between the drive spring 20 and drive e-clip 22 as well as a pair of arm washers 68 in an assembled condition. The preferred switch arm 66 moves axially along the drive axis 18 when the drive pin 14b moves between the retracted and extended positions. Specifically, the switch arm 66 is loosely fit around the drive pin 14b such that it does not rotate when the drive pin 14b rotates but moves axially with the drive pin 14b. The central ring 66a preferably has an inner ring diameter that is greater than the diameter of the drive pin 14b such that the central ring slides over the drive pin 14b without rotatably coupling the switch arm 66 to the drive pin 14b. The arm protrusion 66b preferably extends radially outwardly from the central ring 66a to a position over the momentary switch 62 such that the arm protrusion 66b contacts and closes the switch 62 when the drive pin 14b is in the retracted position. In addition, when the drive pin 14b moves to the extended position, the arm protrusion 66b preferably is not in contact with the switch 62 and the switch 62 is open.

In the preferred embodiment, the switch arm 66 is mounted relative to the drive pin 14b and the housing 12 by a bushing lid 70, a bushing washer 72, the drive spring 20, the arm washer 68 and the drive e-clip 22. Specifically, the bushing lid 70 has a stepped, ring-shape and is constructed of a polymeric material. The bushing lid 70 is positioned on an upper surface of the gear box bushing sleeve 50b, which extends out of the gear box and a portion of the bushing lid 70 extends into an inner diameter of the gear box bushing sleeve 50b to center the bushing lid 70 over the gear box bushing sleeve 50b. The bushing washer 72 is positioned in a basin of the bushing lid 70 and an end of the drive spring 20 is positioned over the bushing washer 72. The basin of the bushing lid 70 aids in preventing the drive spring 20 from sliding off of the bushing lid 70. The switch arm 66 is positioned over an opposite end of the drive spring 20 and the arm washers 68 are positioned between an upper surface of the switch arm 66 and the drive e-clip 22 that is secured to the drive pin 14b. The drive spring 20 may only be compressed to a predetermine height before edges of the central ring 66a engage edges of the bushing lid 70 because the basins in the bushing lid 70 and central ring 66a that face each other,. Preferably, when the drive pin 14b is in the retracted position, the central ring 66a engages or is positioned slightly above the bushing lid 70 and the drive spring 20 is compressed to its smallest height. Alternatively, when the drive pin 14b is in the extended position, the central ring 66a is separated its greatest distance from the bushing lid 70 and the drive spring 20 is stretched to its greatest length when the kitchen appliance 10 is assembled.

Figure 2B:
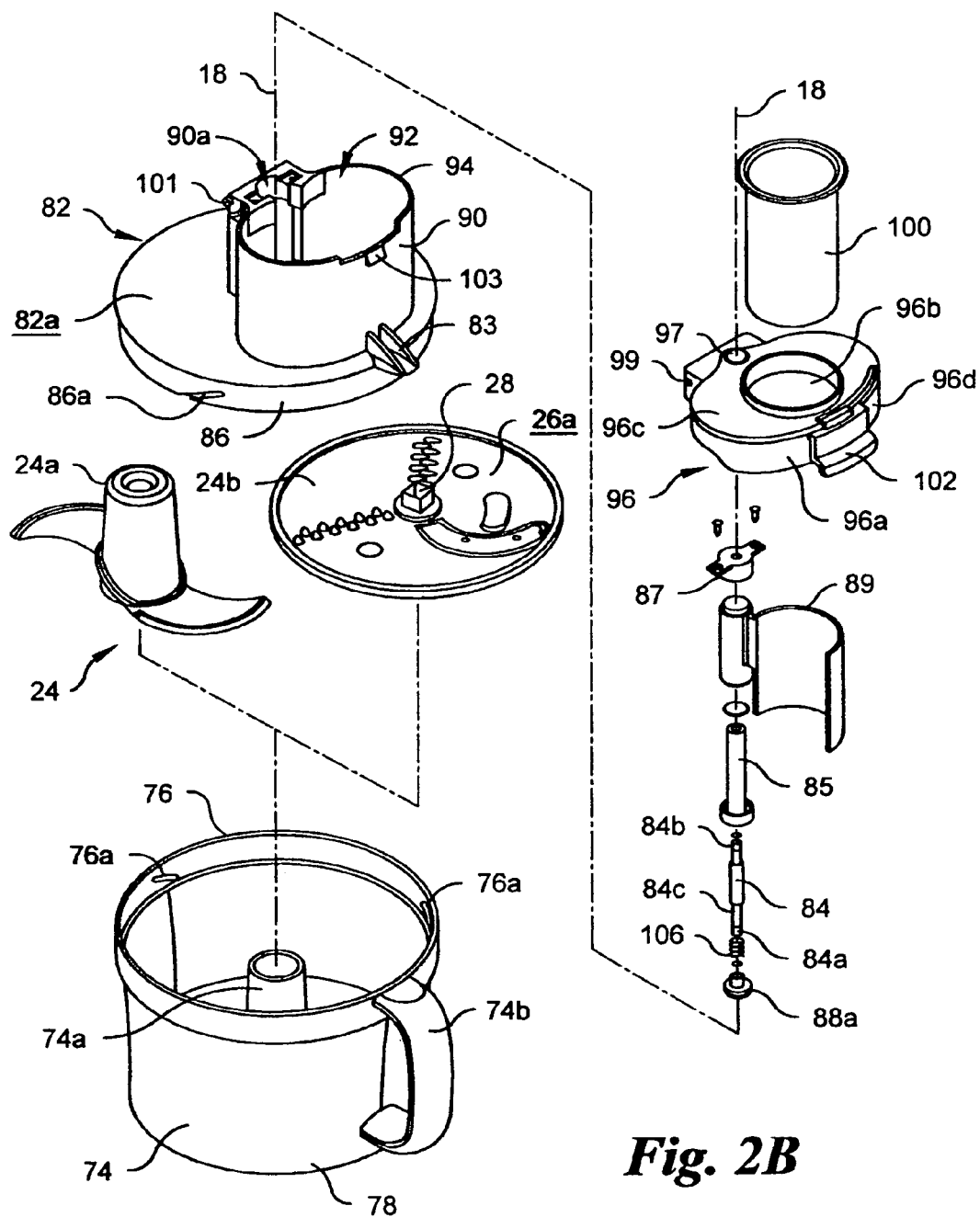
FIG. 2B is an exploded perspective view of the bowl and bowl lid of the kitchen appliance shown in FIG. 1.

Referring to FIGS. 1, 2B and 3A, the kitchen appliance 10 of the present application includes a bowl 74 that is removably mountable to the housing 12. In the preferred embodiment, the bowl 74 is constructed of a molded, transparent styrene acrylonitrile (SAN) material. The bowl 74 is not limited to constructions using molded SAN material and may be constructed of nearly any polymeric, metal, glass, or like material that is able to take on the general shape of the bowl and withstand the normal operating conditions of the bowl.

The bowl 74 includes a bowl mouth 76 into which foodstuff may be inserted and, in the preferred embodiment, includes a lower skirt 78 with a series of locking lugs 78a extending from its inner surface. The upper shell 12a includes complementary locking grooves 80 on its upper side surface that releasably engage the locking lugs 78a when the bowl 74 is removably mounted to the housing 12. The locking lugs 78a engage the locking grooves 80 in a twist or bayonet-type lock that is generally well known to one having ordinary skill in the art. The bowl 74 and housing 12 are not limited to being removably mountable to each other through the locking lugs 78a and locking grooves 80. The bowl 74 may be removably mounted to the housing 12 in nearly any manner including clamps, bolts or other similar fastening devices that permit the bowl 74 to be removably mounted to the housing 12. In addition, the bowl 74 is not limited to being removable from the housing 12 and may be fixed to or integral with the housing 12. However, the bowl 74 is preferably removably mounted to the housing 12 such that processed foodstuff may be transported in the bowl 74.

In the preferred embodiment, the bowl 74 includes four equally spaced locking lugs 78a positioned radially about the inner surface of the lower skirt 78 and the housing 12 includes four complementary locking grooves 80 on its upper side surface. Accordingly, in the preferred embodiment, the bowl 74 is removably mountable relative to the housing 12 in four distinct positions. In contrast, prior art bowls for kitchen appliances are mountable in only one orientation relative to their housing because a safety interlock is only actuated when the bowl is mounted to the housing in the single predetermined orientation. The kitchen appliance 10 is not limited to the inclusion of four locking lugs 78a and four locking grooves 80 and may include nearly any number of locking lugs 78a and locking grooves 80 that are able to releasably mount the bowl 74 to the housing 12. In addition, the bowl 74 may be mounted to the housing 12 using an alternative mounting mechanism, which is described above, that mounts the bowl 74 relative to the housing in nearly any orientation. The bowl 74 is preferably mountable to the housing 12 in nearly any orientation because the central shaft interlock, comprised at least partly of the movable drive pin 14b that is located along the drive axis 18, eliminates the need to orient the bowl 74 relative to the housing 12 at a predetermined single orientation.

In the preferred embodiment, the drive shaft 14 extends into the bowl 74 when the bowl 74 is mounted to the housing 12 in a working position. The bowl 74 preferably includes a central sleeve 74a that has a generally cylindrical shape and is integrally molded with a bottom wall of the bowl 74 that accommodates insertion of the drive shaft 14 into the bowl 74 in the working position. The central sleeve 74a is not limited to being integrally molded with a bottom wall of the bowl 74 and may be separate from the bowl 74 or may be completely excluded from the bowl 74, for example, if the bowl 74 is integrally molded or fixed to the housing 12.

In the preferred embodiment, the bowl 74 also includes an integral handle 74b that is molded to a side of the bowl 74. The handle 74b is preferably used to provide leverage for engaging and removing the bowl 74 from the housing 12 and for transporting the bowl 74. The bowl 74 is not limited to constructions including a handle 74b and may be constructed without a handle or with multiple handles (not shown).

Referring to FIGS. 1 and 2B, a bowl lid 82 is removably mountable over the bowl mouth 76. The bowl lid 82 is in a working position when it is mounted over the bowl 74 and the bowl 74 is mounted to the housing 12. In the preferred embodiment, the bowl lid 82 is constructed of the same transparent SAN material as the bowl 74 but is likewise not limited to the SAN material. The bowl lid 82 may be constructed of nearly any material that can take on the general shape of the bowl lid 82 and is able to withstand the normal operating conditions of the bowl lid 82, for example, a polymeric, metal, glass or like material.

In the preferred embodiment, the bowl lid 82 has a generally circular shape with an internal skirt 86 that extends downwardly from a top bowl lid wall 82a. In the preferred embodiment, the internal skirt 86 includes lid grooves 86a and the bowl includes lid ribs 76a adjacent the bowl mouth 76. The bowl lid 82 is removably mountable over the bowl mouth 76 by twist or bayonet locking the lid ribs 76a in the lid grooves 86a similar to the locking of the bowl 74 to the housing 12. The bowl lid 82 is not limited to twist locking to the bowl 74 using the lid grooves 86a and lid ribs 76a and may be removably mounted to the bowl 74 using any releasable mounting mechanism, including set screws, clamps or other like releasable mounting mechanisms that would be obvious to one having ordinary skill in the art. In addition, the bowl lid 82 is not limited to being directly removably mountable to the bowl 74. The bowl lid 82 may be removably mountable over the bowl mouth 76 through a spacer (not shown) or other device that would mount the bowl lid 82 over the bowl mouth 76. Further, the bowl lid 82 is not limited to being removable from the bowl 74 and may be integrally molded with the bowl and include a hole therein that is used to insert foodstuff into the bowl 74 for processing therein (not shown).

Referring to FIGS. 2B–4, a lid shaft 84 is mounted to the bowl lid 82 and is in an operative relationship with the drive shaft 14 when the bowl 74 and bowl lid 82 are in the working position. In the preferred embodiment, when the bowl 74 and bowl lid 82 are in the working position, the hollow drive sleeve 14*a* at least partially extends into a hole 88 in a central section of the bowl lid 82 through which the drive axis 18 extends. A lid sleeve 88*a* is positioned within the hole 88 and centers an upper end of the drive sleeve 14*a* and a lower end of the lid shaft 84 along the drive axis 18. The lid sleeve 88*a* also provides stability for the cantilevered upper end of the hollow drive sleeve 14*a* and aids in centering the bowl lid 82 on the bowl 74.

In the preferred embodiment, the lid shaft 84 includes a first end 84*a* and a second end 84*b* and has a generally cylindrical, solid configuration. The lid shaft 84 is preferably constructed of a metallic material but is not so limited. The lid shaft 84 may be constructed of nearly any material that can take on the general shape of the lid shaft 84 and withstand the normal operating conditions of the lid shaft 84, which may include materials such as wood, polymers or other like materials.

In the preferred embodiment, the lid shaft 84 is in an operative relationship with the drive pin 14*b* of the drive shaft 14 through the lid sleeve 88*a* and a hole in the top of the hollow drive sleeve 14*a*. That is, the lid shaft 84 is able to contact the upper end of the drive pin 14*b* through the lid sleeve 88*a* and upper open end of the hollow drive sleeve 14*a* along the drive axis 18.

Referring to FIGS. 3A and 3B, the lid shaft 84 urges the at least one portion of the drive shaft 14 into the retracted position when the lid shaft 84 is in an operative position. Specifically, the drive pin 14*b* is urged by the lid shaft 84 into the retracted position when the lid shaft 84 is in the operative position such that power is able to be provided to the kitchen appliance 10. That is, in the working position of the bowl 74 and bowl lid 82, the lid shaft 84 urges the drive pin 14*b* into the retracted position and the switch 62 is closed such that power is able to be provided to the motor 32.

Referring to FIGS. 1 and 2B–4, in the preferred embodiment, a feed tube 90 extends from the top bowl lid wall 82*a* of the bowl lid 82. The feed tube 90 preferably extends generally perpendicularly from the top bowl lid wall 82*a* and is integrally molded with the bowl lid 82. Accordingly, the feed tube 90 is preferably constructed of the SAN material. The feed tube 90 is not limited to the SAN material or to being integrally molded with the bowl lid 82. For example, the feed tube 90 may be constructed of nearly any, generally rigid material that is able to take on the general shape of the feed tube 90 and withstand the normal operating conditions of the feed tube 90. The feed tube 90 may be constructed separately from the bowl lid 82 and fastened or secured to the top bowl lid wall 82*a* after construction of the bowl lid 82. The feed tube 90 preferably extends from the top bowl lid wall 82*a* generally parallel to the drive axis 18. The feed tube 90 is not limited to extending generally parallel to the drive axis 18 or perpendicular to the top bowl lid wall 82*a* and may extend from the bowl lid 82 at nearly any angle that permits the feed tube 90 to perform its intended functions, as is described in detail below.

Referring to FIGS. 1 and 2B, the bowl lid 82 includes a shoulder 83 that preferably extends between a side wall of the feed tube 90 and the top lid bowl wall 82*a* adjacent a periphery of the bowl lid 82. The shoulder 83 preferably extends beyond a periphery of the top lid bowl wall 82*a* to a position over then handle 74*b* when the bowl lid 82 is mounted over the bowl 74. The shoulder 83 is preferably integrally molded with the bowl lid 82 and feed tube 90 and is comprised of a pair of side-by-side ramp-shaped legs. The shoulder 83 preferably extends over a top of the handle 74*b* along the same contour of an outside surface of the handle 74*b* to provide a clean, continuous appearance. The shoulder 83 is also preferably used to provide leverage for pivoting the bowl lid 82 relative to the bowl 74 to mount and release the bowl lid 82 to the bowl 74.

Figure 5:
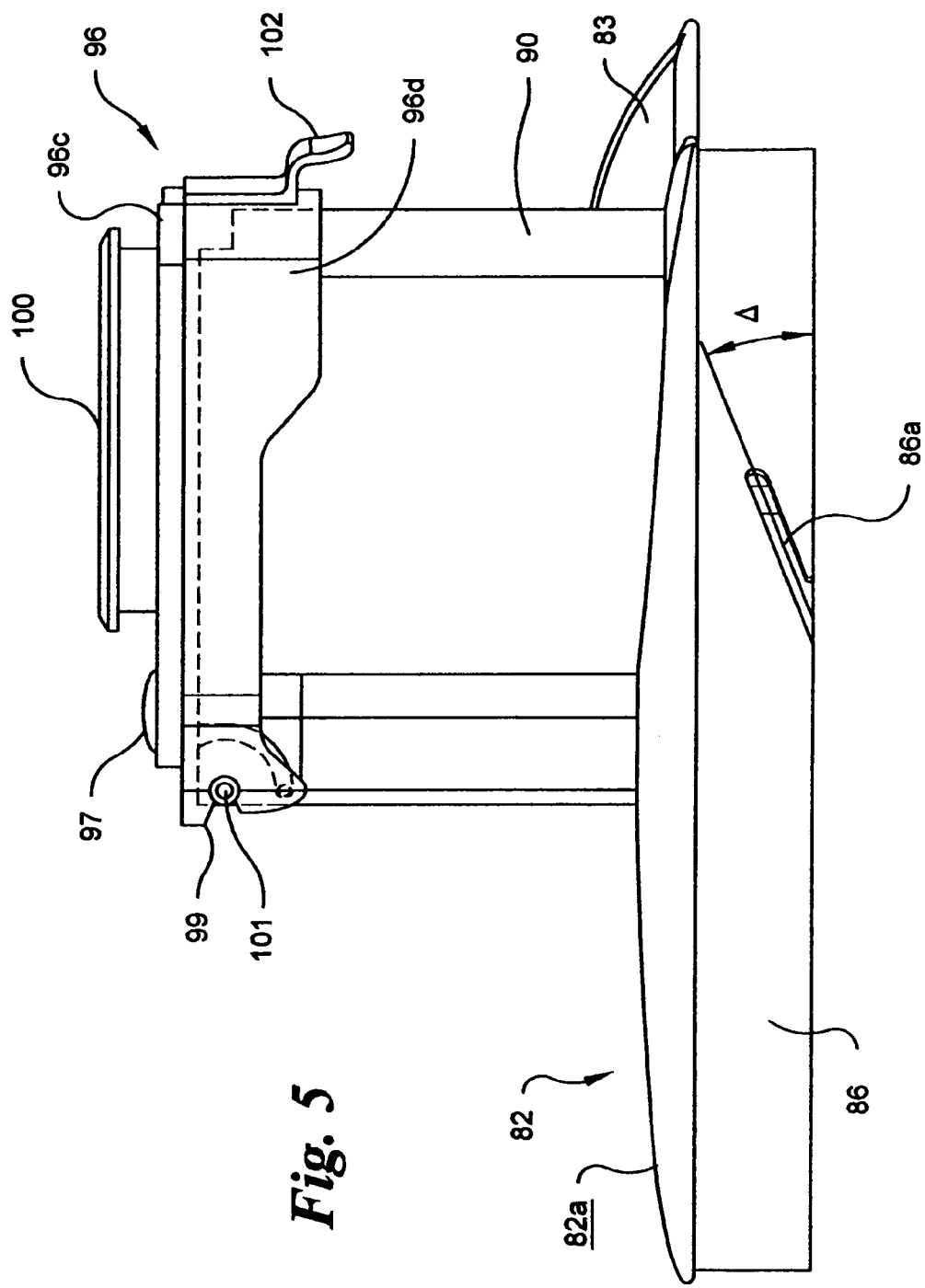
FIG. 5 is a right-side elevational view of the bowl lid and feed tube lid of the kitchen appliance shown in FIG. 1.

Referring to FIGS. 1, 2B and 5, to mount the bowl lid 82 to the bowl 74, the bowl lid 82 is positioned onto the bowl mouth 76 such that the internal skirt 86 is positioned below the bowl mouth 76 and the shoulder 83 is slightly to the right of the handle 74*b* as viewed in FIG. 2B. The handle 74 is grasped with the user's fingers and the shoulder 83 is grasped with the user's thumb to provide leverage for pivoting the shoulder 83 to a position above the handle 74*b*. When the bowl lid 82 pivots relative to the bowl 74, the lid grooves 86*a* and lid ribs 76*a* engage with each other to removably mount the bowl lid 82 to the bowl 74. To remove the bowl lid 82 from the bowl 74, the handle 74*b* is again grasped by the fingers and the shoulder 83 is pushed by the user's thumb to pivot the bowl lid 82 relative to the bowl 74 and release the lid grooves 86*a* from the lid ribs 76*a*. The bowl lid 82 is not limited to the inclusion of the shoulder 83 or to the specific shape or construction of the shoulder 83.

Referring to FIGS. 1, 2B, 3A, 4 and 5, in the preferred embodiment, the bowl lid 82 includes three lid grooves 86*a* and the bowl 74 includes three complementary lid ribs 76*a*. The lid grooves 86*a* and lid ribs 76*a* are spaced around a periphery of the bowl lid 82 and bowl 74 such that the bowl lid 82 is only mountable to the bowl 74 with the shoulder 83 positioned over the handle 74*b* in the working position. The bowl 74 and bowl lid 82 are not limited to three lid ribs 76*a* and three lid grooves 86*a*. The bowl 74 and lid 82 may include nearly any number of lid ribs 76*a* and lid grooves 86*a* that enable removable mounting of the bowl lid 82 to the bowl 82. In addition, the bowl lid 82 and bowl 74 are not limited to ribs 76*a* and grooves 86*a* that mount the bowl lid 82 to the bowl 74 such that the shoulder 83 is over the handle 74*b* in the working position. Similar to the mounting of the bowl 74 to the housing 12, the bowl lid 82 may be mounted at nearly any orientation relative to the bowl 74 that permits the lid shaft 84 to urge the drive pin 14*b* to its retracted position when the bowl lid 82 is mounted to the bowl 74 in the working position.

Referring to FIGS. 1, 2B, 4 and 5, the feed tube 90 defines a feed cavity 92 and includes a feed mouth 94 and an outlet end 94*b*. Foodstuff may be inserted into the feed cavity 92 through the feed mouth 94 and falls out of the feed cavity 92 and into the bowl 74 out of the outlet end 94*b*. The feed tube 90 has a generally oval-shaped cross section with an indentation in one side and is preferably hollow. The feed tube 90 is not limited to the oval shape and may take on nearly any shape that defines a feed cavity 92 into which foodstuff may be placed for insertion into the bowl 74 when the bowl 74 and bowl lid 82 are in the working position.

Figure 4:
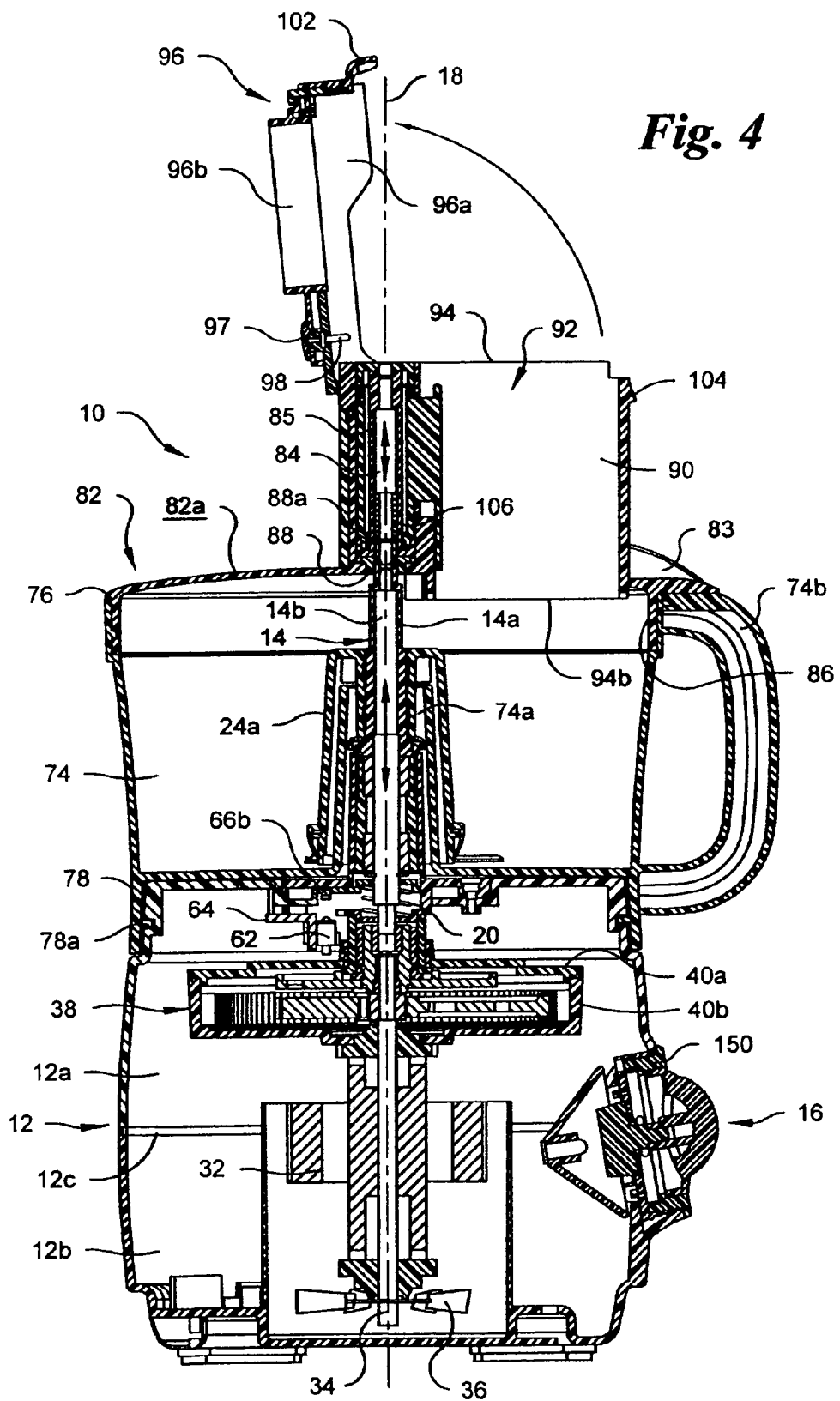
FIG. 4 is a cross-sectional view of the kitchen appliance shown in FIG. 1 with a feed tube cover in a loading position, taken along line 3—3 of FIG. 1.

In the preferred embodiment, the lid shaft 84 is movably mounted to the feed tube 90. The lid shaft 84 is preferably movable along the drive axis 18 between the operative position (FIG. 3A) and a safety position (FIG. 4). The lid shaft 84 is not limited to being movably mounted to the feed tube 90 or to the bowl lid 82. The lid shaft 84 may be fixed to the bowl lid 82, as long as the lid shaft 84 is in an operative relationship with the drive shaft 14 when the bowl 74 and bowl lid 82 are in the working position.

Referring to FIGS. 2A, 2B, 3B and 4, in the preferred embodiment, a lid shaft housing 85 is mounted within the feed tube 90 and guides the movement of the lid shaft 84 between the operative and safety positions. The lid shaft housing 85 has a generally bolt-shape with a relatively long, slender cylindrical section and a comparatively enlarged, short cylindrically-shaped head. The lid shaft housing 85 includes a bore therethrough that the lid shaft 84 is slidably positioned within. The lid shaft housing 85 is preferably constructed of a polymeric material and is mounted between the lid sleeve 88a and a lid shaft cover 87. The lid shaft cover 87 is preferably fixed to an upper end of the feed tube 90 and includes a bore therethrough. The lid shaft cover 87 is also preferably constructed of a polymeric material. The lid shaft housing 85 and lid shaft cover 87 are not limited to polymeric constructions and may be constructed of nearly any material that can take on the general shape of these components and withstand their normal operating conditions.

In the preferred embodiment, the lid shaft housing 85 and a hub of a pivoting gate 89 are mounted within a feed tube bore 90a on a rear side of the feed tube 90. The feed tube bore 90a extends through a side of the feed tube 90 along the drive axis 18. The pivoting gate 89 extends from its hub into the feed cavity 92 to manipulate foodstuff within the feed cavity 92. The gate 89 is preferably constructed of a polymeric material and includes an arc-shaped section that extends into the feed cavity 92. The gate 89 is not limited to the polymeric material or the above-discussed shape. The gate 89 may be constructed of nearly any material and have nearly any shape that is able to take on the general shape of the gate 89 and can be utilized to manipulate foodstuff that is positioned within the feed cavity 92.

Referring to FIGS. 1, 2B, 3A and 4, in the preferred embodiment, the kitchen appliance 10 further includes a feed tube lid 96 that is removably mountable to the feed mouth 94 of the feed tube 90 and includes a tab 98. The feed tube lid 96 covers at least a portion of the feed mouth 94 in a closed position, thereby limiting access to the feed cavity 92. The tab 98 preferably contacts and moves the lid shaft 84 to its operative position when the feed tube lid 96 is in the closed position (FIG. 3A). The tab 98 is preferably constructed of a metallic material and has a generally bolt-shape with an enlarged head and a generally cylindrically-shaped shaft. The tab 98 is preferably molded into a root portion of the feed tube lid 96. The tab 98 is not limited to metallic constructions nor to the above-described shape and may take on nearly any shape and be formed of nearly any material that permits the tab 98 to contact and move the lid shaft 84 to its operative position when the feed tube lid 96 is in the closed position. In addition, the tab 98 is not limited to being separately constructed from the feed tube lid 96 and may be integrally molded with the feed tube lid 96.

Referring to FIGS. 1, 2B and 5, in the preferred embodiment, the feed tube lid 96 is comprised of a first plate 96c and a second plate 96d that are pivotally secured together at a pivot hub 97. The feed tube lid 96 has a generally planar upper surface with a shape that generally conforms to and is slightly larger than the feed mouth 94. A feed tube lid skirt 96a is associated with the second plate 96d and extends downwardly from a periphery of the feed tube lid 96. The feed tube lid 96 is preferably constructed of the same SAN material as the bowl lid 82 and bowl 74. The feed tube lid 96 is not limited to constructions using the SAN material and may be constructed of nearly any rigid material that can take on the general shape of the feed tube lid 96 and withstand the normal operating conditions of the feed tube lid 96. For example, the feed tube lid 96 may be constructed of a polymeric, glass, metal or a like material.

A generally cylindrical pusher hole 96b is preferably associated with the first plate 96c and extends through its top surface. The pusher hole 96b accommodates a food pusher 100 therein that has a generally cylindrical shape with a closed bottom and an open top. The food pusher 100 has a cross-sectional diameter that is slightly smaller than the diameter of the pusher hole 96b such that the pusher 100 is removably receivable into and slidable within the pusher hole 96b. The pusher 100 is constructed of the same SAN material as the feed tube lid 96, bowl lid 82 and bowl 74 and is likewise not limited to this material. The food pusher 100 is also not limited to generally cylindrical shapes nor to the specific above-identified shape of the preferred pusher 100 and may have nearly any shape that permits the insertion of the pusher 100 into the feed cavity 92 when the feed tube lid 96 is in the closed position. The construction and operation of the food pusher 100 is generally well known to one having ordinary skill in the art.

Referring to FIGS. 1, 2B and 3A, in the preferred embodiment, the feed tube 90 and, therefore, the feed cavity 92 are larger than a feed tube and feed cavity of a conventional kitchen appliance. Specifically, the preferred feed tube 90 has a height of approximately three inches (3") a maximum cross-sectional width of approximately five inches (5") and a minimum cross-sectional depth of approximately two and three-quarters inches (2¾"). In addition, the preferred pusher hole 96b has a diameter of approximately two and one-half inches (2½") to limit access to the feed cavity 92 when the kitchen appliance 10 is being operated. The first and second plates 96c, 96d of the feed tube lid 96 are assembled to permit the pusher hole 96b to be centered over various portions of the feed cavity 92 while limiting access to the feed cavity 92 during operation of the kitchen appliance 10. Specifically, the first plate 96c may pivot about the pivot hub 97 relative to the second plate 96d such that the pusher hole 96b is located over various parts of the feed cavity 92. Therefore, the food pusher 100 is drivable into the feed cavity 92 at different locations, while access to the feed cavity 92 and tool 24 is limited because the feed mouth 94 is covered by the feed tube lid 96.

Referring to FIGS. 2B, 3A and 4, in the preferred embodiment, the feed tube lid 96 is pivotable relative to the feed tube 90 on a pair of pivot slots 99 associated with the second plate 96d and a pair of pivot nubs 101 associated with the feed tube 90. The feed tube lid 96 is preferably pivotable between the closed position (FIGS. 1, 3A and 5) and a loading position (FIG. 4). The feed tube lid 96 is not limited to being pivotable relative to the feed tube 90 nor to being secured to the feed tube 90. For example, the feed tube lid 96 may be snap-fit or permanently secured to the feed mouth 94 to cover or at least partially cover the feed mouth 94 when the feed tube lid 96 is in the closed position. In addition, the feed tube lid 96 may be pivotally secured to the top bowl lid wall 82a such that it is pivotable between the loading and closed positions to alternatively cover or expose the feed cavity 92 and feed mouth 94.

Referring to FIGS. 1, 2B, 3A and 4, in the preferred embodiment, the feed tube lid 96 is secured to the feed tube 90 in the closed position by at least a feed tube latch 102. The feed tube latch 102 is preferably pivotally mounted to the second plate 96d and is constructed of a polymeric material. The feed tube latch 102 preferably secures a side of the feed tube lid 96 opposite its pivotable attachment to the feed tube 90 to a front edge of the feed tube 90 through a hook 104 associated with the feed tube 90. The feed tube latch 102 may conversely be pivoted out of engagement with the hook 104 to release the feed tube lid 96 from the closed position. The kitchen appliance 10 is not limited to the inclusion of the feed tube latch 102 and hook 104 or to the specific configuration of the feed tube latch 102 and hook 104 to secure the feed tube lid 96 to the feed tube 90 in the closed position. The feed tube latch 102 and hook 104 are preferred such that the feed tube lid 96 is at least partially secured over the feed mouth 94 of the feed tube 90 in the closed position and during operation of the kitchen appliance 10.

Referring to FIGS. 3A and 4, the feed cavity 92 is preferably exposed when the feed tube lid 96 is in the loading position. In the loading position, foodstuff having a size that is at least as large as the enlarged feed tube 90 may be inserted into the feed cavity 92 through the feed mouth 94. Foodstuff may also be inserted into the feed cavity 92 when the feed tube lid 96 is in the closed position through the pusher hole 96b. However, the size of foodstuff that is insertable into the feed cavity 92 when the feed tube lid 96 is in the closed position is limited to the size of the pusher hole 96b. Therefore, it is preferable that the feed tube lid 96 is pivotable or at least releasable from the feed tube 90, thereby exposing the entire feed cavity 92 for insertion of foodstuff that is as large as the feed mouth 94.

Referring to FIGS. 2B, 3A and 4, in the preferred embodiment, the lid shaft 84 is biased toward the safety position preferably by a lid spring 106 that is preferably a compression spring. The lid spring 106 is preferably mounted within the feed tube bore 90a between a lower shoulder 84c of the lid shaft 84 and the lid sleeve 88a. The lid shaft 84 is not limited to being biased toward the safety position or to being movable at all. However, the lid shaft 84 is preferably biased by the lid spring 106 or any other biasing device, for example, a flexible polymeric cushion, rubber band or like implement that biases the lid shaft 84 toward the safety position. Biasing the lid shaft 84 toward the safety position preferably prevents the lid shaft 84 from moving from the safety position to the operative position without an external force being applied to the second end 84b of the lid shaft 84.

Referring to FIGS. 2B and 3A, in the preferred embodiment, the tab 98 contacts the lid shaft 84 through the bore in the lid shaft cover 87 when the feed tube lid 96 is in the closed position and forces the lid shaft 84 against the bias of the lid spring 106 from the safety position to the operative position. Referring specifically to FIG. 3A, when the feed tube lid 96 is in the closed position, the tab 98 urges the lid shaft 84 into the operative position, which contacts and urges the drive pin 14b into the retracted position closing the switch 62 and enabling electric power to flow to the motor 32 when the bowl 74 and bowl lid 82 are in the working position.

Referring to FIGS. 1, 2B and 5, in the preferred embodiment, the lid grooves 86a extend from a bottom edge of the internal skirt 86 at an engagement angle Δ. The lid ribs 76a also extend along an inner surface of the bowl 74 adjacent the bowl mouth 76 at the same engagement angle Δ so that they are complementary with the lid grooves 86a. The engagement angle Δ of the preferred embodiment is approximately fifteen to thirty degrees. The engagement angle Δ is preferably large when compared to conventional engagement angles of kitchen appliances. It is preferred that the engagement angle Δ is large so that the bowl lid 82 moves downwardly at a relatively steep angle relative to the bowl 74 to the working position. The steep engagement angle Δ limits the possibility that lid shaft 84 engages and moves the drive pin 14b into the retracted position, thereby enabling power to be provided to the motor 32, when the bowl lid 82 is not fully engaged with the bowl 74 in the working position. That is, if the engagement angle Δ is shallow, the bowl 74 is mounted to the housing 12 in the working position and the feed tube lid 96 is mounted to the feed tube 90 in the closed position, the bowl lid 82 may not be fully engaged with the bowl 74 through the lid grooves 86a and lid ribs 76a when the lid shaft 84 urges the drive pin 14b to the retracted position, thereby prematurely enabling electric power to be provided to the motor 32.

The engagement angle Δ is not limited to the fifteen to thirty degree angle range and may take on nearly any angle from nearly zero to ninety degrees relative to the bottom edge of the internal skirt 86. However, the above-listed engagement angle Δ is preferred to limit the chance that the switch 62 is actuated to the closed position when the bowl 74 and bowl lid 82 are not fully engaged in the, working position and for user friendly mounting of the bowl 74 to the bowl lid 82.

Referring to FIGS. 2A, 3A and 4, the locking lugs 78a and locking grooves 80 that removably mount the bowl 74 to the housing 12 also preferably extend from horizontal in the preferred range of the engagement angle Δ. The locking lugs 78a and locking grooves 80 extend at the engagement angle Δ to preferably prevent the switch 62 from being actuated to the closed position when the bowl 74 is not fully engaged with the housing 12 in the working position. Similar to the lid grooves 86a and lid ribs 76a, the locking lugs 78a and locking grooves 80 are not limited to extending from horizontal at above-listed range for the engagement angle Δ. The locking lugs 78a and locking grooves 80 may extend from horizontal at nearly any angle but preferably extend from horizontal in the range of the engagement angle Δ to aid in preventing premature actuation of the switch 62 to the closed position.

Referring to FIGS. 1 and 2, in the preferred embodiment, an indicator 150 is mounted around a periphery of the control mechanism 16. The indicator provides a visual indication to a user that the bowl 74 and bowl lid 82 are in the working position and the feed tube lid 96 is in the closed position such that power may be provided to the motor 32. Accordingly, if these components are not properly aligned and the motor 32 is not capable of being provided with power, the indicator 150 will not provide an indication and a user will be aware that the kitchen appliance 10 is not ready for operation. The indicator 150 is preferably a light which is illuminated when power is provided to the motor 32. The kitchen appliance 10 is not limited to the inclusion of the indicator 150.

Referring to FIGS. 2A and 3A, in the preferred embodiment, the housing 12 includes a retaining channel 110 that is positioned adjacent the top bore 11 and above the switch arm 66 when the kitchen appliance 10 is assembled. In the preferred embodiment, the retaining channel 110 is comprised of a generally rectangular, box-shaped void formed in an upper surface of the upper shell 12a and is located beneath the drive shaft housing 114. The arm protrusion 66b extends into and is movable generally parallel to the drive axis 18 within the retaining channel 110 when the kitchen appliance 10 is assembled. The retaining channel 110 blocks the switch arm 66 from rotating relative to the housing 12 when the drive shaft 14 rotates. Specifically, as was described above, the switch arm 66 is secured to the drive pin 14b by the central ring 66a encompassing the drive pin 14b in a relatively loose fit fashion. Accordingly, the switch arm 66 moves axially along the drive axis 18 as the drive pin 14b moves axially along the drive axis 18. However, because the arm protrusion 66b is positioned in the retaining channel 110, the switch arm 66 is blocked from rotating with the drive pin 14b as it rotates. Therefore, when the drive pin 14b rotates, even if friction forces between the central ring 66a and the drive pin 14b drives the switch arm 66 to rotate, contact between the arm protrusion 66b and the retaining channel 110 does not permit the switch arm 66 to rotate.

The housing 12 is not limited to the inclusion of the retaining channel 110 to prevent rotation of the switch arm 66. For example, a pin (not shown) may extend from the housing 12 to prevent rotation of the switch arm 66 relative to the switch 62. In addition, the kitchen appliance 10 is not limited to a switch arm 66 that does not rotate when the drive shaft 14 rotates. For example, the switch 62 may include a ring-shaped actuator (not shown) that encompasses the drive shaft 14 at a lower end such that regardless of where the arm protrusion 66b is radially located about the drive axis 18, the arm protrusion 66b contacts and closes the switch 62 when the drive pin 14b is in the retracted position.

Referring to FIG. 2A, in the preferred embodiment, the drive sleeve 14a includes the male coupling 30 on an upper outside surface and the drive pin 14b includes drive shaft coupling teeth 112 on an upper peripheral surface. The coupling 30 on the drive sleeve 14a rotatably couple the tool 24 to the drive sleeve 14a and the drive shaft coupling teeth 112 rotatably couple the drive pin 14b to the drive sleeve 14a. The drive shaft coupling teeth 112 are preferably, relatively long to provide a relatively large coupling area for transferring rotation forces between the metallic drive pin 14b and the polymeric drive sleeve 14a. The relatively large coupling area is preferred because transferring rotational forces between the drive pin 14b and the drive sleeve 14a may potentially damage the polymeric drive sleeve 14a due to the material property differences between the metallic pin 14b and polymeric sleeve 14a. Therefore, the relatively large coupling area between the drive shaft coupling teeth 112 and the drive sleeve 14a tends to reduce the coupling stresses on the polymeric drive sleeve 14a as will be understood by one having ordinary skill in the art.

Referring to FIGS. 2A and 3B, in the preferred embodiment, the kitchen appliance 10 includes the drive shaft housing 114 that is secured to the upper shell 12a with fasteners 116. The drive shaft housing 114 has a generally planar lower plate that is secured to the upper shell 12a over the retaining channel 110 and a cylindrical-shaped tube that covers at least a portion of the drive shaft 14 that extends out of the housing 12. The drive shaft housing 114 is securely fixed to the housing 12 and covers a portion of the drive shaft 14 to at least partially protect the drive shaft 14 from being bent by external forces and to prevent foodstuff or other materials from entering a top bore 11 of the housing 12. It is preferable that foodstuff and other materials do not enter the housing 12 where they may come into contact with and damage the motor 32, the gear reduction mechanism 38 or parts of the drive shaft 14 or safety interlock that are located in the housing 12. The kitchen appliance 10 is not limited to the inclusion of the drive shaft housing 12 or the specific above-described configuration of the drive shaft housing 114. However, the drive shaft housing 114 is preferred to partially protect the drive shaft 14 and to foodstuff or other materials from entering the housing 12.

The hollow drive sleeve 14a is movably secured to the drive shaft housing 114 by a sleeve ring 15 in the preferred embodiment. The sleeve ring 15 has a generally disc-shape with a central hole and is bent downwardly at its ends. The sleeve ring 15 is preferably constructed of a polymeric material and is ultrasonically welded adjacent a lower end of the drive sleeve 14a above a sleeve shoulder 120 after the drive sleeve 14a is inserted within and extends from the cylindrical-shaped tube of the drive shaft housing 114. A gap is created between the sleeve ring 15 and the sleeve shoulder 120 such that the drive sleeve 14a is movable, generally along the drive axis 18, relative to the drive shaft housing 114. In an assembled condition, either the sleeve ring 15 or the sleeve shoulder 120 engage a shaft housing lip 114a at a top of the drive shaft housing 114 to movably secure the drive sleeve 14a to the drive shaft housing 114. The drive sleeve 14a is preferably movable along the drive axis 18 to provide some tolerance when mounting the tool 24 to the drive sleeve 14a. The sleeve ring 15 and, specifically, the downward bend of the ends of the sleeve ring 15 generally prevent foodstuff and other materials from entering the housing 12 through the top bore 11. The drive sleeve 14a is not limited to having the sleeve ring 15 attached thereto and will operate without the inclusion of the sleeve ring 15 or with a differently configured sleeve ring 15.

Referring to FIGS. 2A and 3B, in the preferred embodiment, the drive pin 14b is rotatably isolated from the drive shaft housing 114 by three polymeric bushings 130, 132, 134. Each of the bushings 130, 132, 134 has a generally cylindrical shape with a central bore to accommodate the drive pin 14b. The bushings 130, 132, 134 include a relatively long outer bushing 130, an upper bushing 132 and a lower bushing 134. The bushings 130, 132, 134 included notches 130a, 132a, 134a on an external surface to position the outer bushing 130 within the drive shaft housing 114 and to position the upper and lower bushings 132, 134 within the outer bushing 130. The notches 130a, 132a, 134a also secure the bushings 130, 132, 134 to the drive shaft housing 114 to rotationally isolate the drive pin 14b from the drive shaft housing 114. The bushings 130, 132, 134 are not limited to polymeric constructions or to the specific configuration described above. For example, the bushings 130, 132, 134 may be constructed of a single bushing (not shown) that is constructed of a metallic material.

The bushings 130, 132, 134 are mounted in the drive shaft housing 114 between a lower end of the sleeve shoulder 120 of the drive sleeve 14a and a bushing e-clip 136 that is secured to a lower end of the drive shaft housing 114. The bushings 130, 132, 134 are not limited to being secured in the drive shaft housing 114 in this manner and may be otherwise configured to rotatably isolate the drive pin 14b from the drive shaft housing 114, for example, by being integrally formed with the drive shaft housing 114.

Referring to FIGS. 1–5, in operation, the bowl 74 is mounted to the housing 12 in the working position. The tool 24 is mounted to the drive sleeve 14a and foodstuff may selectively be loaded into the bowl 74. The bowl lid 82 is mounted to the bowl 74 in the working position by engaging the lid grooves 86a with the lid ribs 76a and twisting the bowl lid 82 relative to the bowl 74 such that the lid grooves 86a slide onto the lid ribs 76a along the relatively steep engagement angle Δ. The feed tube lid 96 is pivotally mounted to the feed tube 90 and is positioned in the loading position (FIG. 4). In the loading position, the lid shaft 84 and drive pin 14b are biased by the drive spring 20 and lid spring 106 toward the safety and extended positions, respectively. When the feed tube lid 96, lid shaft 84 and drive pin 14b are in these positions, the switch 62 is open and power is not provided to the motor 32. When the feed tube lid 96 is in the loading position, foodstuff may be selectively inserted into the feed cavity 92 to either enter the bowl 74 or to remain positioned within the feed cavity 92 supported by the tool 24, for example, the slicer/shredder disc 24b.

When a desired amount of foodstuff is loaded into the feed cavity 92 or into the bowl 74, the feed tube lid 96 is pivoted from its loading position to its closed position and the feed tube latch 102 is engaged with the hook 104 to secure the feed tube lid 96 to the feed mouth 94. In the closed position of the feed tube lid 96, the tab 98 extends through the bore in the lid shaft cover 87, thereby urging the lid shaft 84 to the operative position against the bias of the lid spring 106. When the lid shaft 84 moves to the operative position, the first end 84a of the lid shaft 84 contacts a top end of the drive pin 14b and moves the drive pin 14b to the retracted position against the biasing force of the drive spring 20. When the drive pin 14b moves to the retracted position, the switch arm 66 moves downwardly and the arm protrusion 66b moves downwardly within the retaining channel 110. In the retracted position of the drive pin 14b, the arm protrusion 66b contacts and closes the switch 62 such that power is able to be provided to the motor 32.

Referring to FIGS. 1, 2B, 3A and 5, when the feed tube lid 96 is pivoted from its loading to its closed position but before the second plate 96d is fully engaged in the closed position with the feed mouth 94, the switch 62 may be closed by the arm protrusion 66b. The lid skirt 96a extends below the feed mouth 94 along the sides of the feed tube 90 when the switch 62 may be closed as the tab 98 begins to move the lid shaft 84 and drive pin 14b downwardly toward the operating and retracted positions, respectively. Accordingly, the lid skirt 96a blocks access to the feed cavity 92 to a user even when the feed tube lid 96 is not fully engaged in its working position to prevent a user's hands from coming into contact with the tool 24.

The safety mechanism of the kitchen appliance 10 operates in the above-described manner to prevent a user from gaining access to the tool 24 when the bowl 74 and bowl lid 82 are not in the working position and the feed tube lid 96 is not in the closed position. When these components are not in these positions, a user may insert a hand into an area where it could be cut by the tool 24.

Referring to FIGS. 1–5, the control mechanism 16 is actuated to prompt the motor 32 to operate and rotatably drive the motor shaft 34 when the switch 62 is closed by positioning the bowl 74 and bowl lid 82 in the working position and the feed tube lid 96 in the closed position. Rotation of the motor shaft 34 transmits rotational motion to the gear reduction mechanism 38, which outputs a reduced rotational speed and rotational motion to the drive pin 14b. The drive pin 14b transmits the reduced rotational motion to the hollow drive sleeve 14a, which transmits the rotational motion to the tool 24 for processing foodstuff within the bowl 74. Foodstuff may be processed for an indeterminate amount of time and additional foodstuff may be added into the feed cavity 92 and bowl 74 during operation by removing the food pusher 100 from the pusher hole 96b and inserting foodstuff into the pusher hole 96b. Foodstuff that may become lodged in the feed cavity 92 may be urged out of the feed cavity by urging the foodstuff through the outlet end 94b using the food pusher 100. In addition, by pivoting the first plate 96c relative to the second plate 96d the pusher hole 96b may be centered over various parts of the enlarged feed cavity 92 such that foodstuff in nearly all parts of the feed cavity 92 may be manipulated by the food pusher 100. Further, the gate 89 may be actuated to consolidate foodstuff within the feed cavity 92 into specific areas by pivoting the gate 89 through the feed cavity 92.

At the conclusion of processing, or to insert a foodstuff that is larger than the pusher hole 96b into the feed cavity 92, the feed tube lid 96 is pivoted from the closed position to the loading position by releasing the feed tube latch 102 from the hook 104 and pivoting the feed tube lid 96 to the loading position. When the feed tube lid 96 is pivoted to the loading position, the tab 98 pivots out of the hole in the lid shaft cover 87 and the lid shaft 84 moves from the operating position to the safety position under the force of the lid spring 106. When the lid shaft 84 moves to the safety position, the drive pin 14b is urged by the drive spring 20 to the extended position and the switch arm 66 is released from the switch 62, thereby opening the switch 62. Therefore, when the feed tube lid 96 is in the loading position and the bowl 74 and bowl lid 82 are in the working position, the switch 62 is opened and power is not provided to the motor 32. Accordingly, the motor 32 is not powered and is unable to drive the tool 24 when the switch 62 is open.

The feed tube lid 96 may be removed from the feed tube 90, the bowl lid 82 may be released from the bowl 74, the tool 24 may be released from the drive shaft 14 and the bowl 74 may be removed from the housing 12 for cleaning. Each of the removed components may be separately cleaned or inserted into a dishwasher for convenient cleaning. In addition, the processed foodstuff that is positioned within the bowl 74 may be transported using the handle 74b.

It will be appreciated by those skilled in the art that changes could be made to the embodiment described above without departing from the broad inventive concept thereof. It is understood, therefore, that this application is not limited to the particular embodiment disclosed, but it is intended to cover modifications within the spirit and scope of the present invention as defined by the appended claims.

I claim:

1. A kitchen appliance with a safety interlock for processing foodstuff comprising:
    a housing including a drive shaft extending therefrom, the drive shaft being rotatable about a drive axis, at least one portion of the drive shaft being movable along the drive axis between an extended position and a retracted position;
    a switch supported within the housing;
    a bowl including a mouth, the bowl being removably mountable to the housing, the drive shaft extending into the bowl when the bowl is secured to the housing in a working position; and
    a bowl lid removably mountable over the mouth of the bowl, the bowl lid being in a working position when mounted over the bowl, a lid shaft being mounted on the bowl lid, the lid shaft being in an operative relationship with the drive shaft when the bowl and bowl lid are in the working position, the lid shaft urging the at least one portion of the drive shaft into the retracted position when the lid shaft is in the operative position, the at least one portion of the drive shaft closing the switch in the retracted position such that power is able to be provided to the kitchen appliance.

2. The kitchen appliance of claim 1 further comprising:
    a feed tube extending from a top bowl lid wall, the feed tube defining a feed cavity and including a feed mouth, the lid shaft being movably mounted to the feed tube, the lid shaft being movable along the drive axis between the operative position and a safety position.

3. The kitchen appliance of claim 2 further comprising: a feed tube lid removably mountable to the feed mouth and including a tab, the feed tube lid covering at least a portion of the feed mouth in a closed position, the tab contacting and moving the lid shaft to its operative position when the feed tube lid is in the closed position.

4. The kitchen appliance of claim 3 wherein the feed tube lid is pivotable relative to the feed tube between the closed position and a loading position, the feed tube lid being secured to the feed tube in the closed position by at least a feed tube latch, the feed cavity being exposed when the feed tube lid is in the loading position.

5. The kitchen appliance of claim 4 further comprising: a motor mounted within the housing, the drive shaft including a hollow drive sleeve and a drive pin, the drive pin being movable along the drive axis between the retracted and extended positions, the drive pin being biased toward the extended position and the lid shaft being biased toward the safety position, the tab contacting the lid shaft when the feed tube lid is in the closed position, the lid shaft contacting the drive pin when the lid shaft is in the operative position.

6. The kitchen appliance of claim 1 wherein the drive shaft includes a hollow drive sleeve and a drive pin, the drive pin being movably mounted within the hollow drive sleeve, the drive pin being movable between the extended and retracted positions, the drive pin being spring biased toward the extended position.

7. The kitchen appliance of claim 6 further comprising: a motor mounted within the housing; and a switch arm mounted to an end of the drive pin adjacent the housing, the switch arm closing the switch when the drive pin is in the retracted position such that power can be provided to the motor.

8. The kitchen appliance of claim 7 wherein the switch arm is mounted to the end of the drive pin such that the switch arm moves along the drive axis when the drive pin moves along the drive axis between the retracted and extended positions, the switch arm being rotationally isolated from the drive pin.

9. The kitchen appliance of claim 6 further comprising: a tool removably mountable to the hollow drive sleeve.

10. The kitchen appliance of claim 9 further comprising: a motor mounted within the housing, the tool being rotatably driven by the hollow drive sleeve, the hollow drive sleeve being driven by the drive pin, the drive pin being driven by a gear reduction mechanism, the gear reduction mechanism being driven by a motor shaft of the motor.

11. A kitchen appliance with a safety interlock for processing foodstuff comprising:
a housing including a motor therein, the motor including a motor shaft that rotatably drives a drive shaft, the drive shaft extending from the housing along a drive axis, a drive pin comprising at least a portion of the drive shaft, the drive pin being movable along the drive axis between a retracted position and an extended position;
a switch positioned in the housing, the switch being in an operative relationship with the motor;
a bowl including a mouth, the bowl being removably mountable to the housing such that the drive shaft extends into the bowl in a working position;
a bowl lid removably mountable over the mouth of the bowl when the bowl is in the working position, the bowl lid including a feed tube with a feed mouth, the feed tube extending from a top bowl lid wall, a lid shaft being movably mounted to the feed tube, the lid shaft being movable between an operative position and a safety position; and
a feed tube lid movably mounted to the feed tube adjacent the feed mouth, the feed tube lid including a tab extending therefrom, the feed tube lid covering at least a portion of the feed tube mouth in a closed position, the tab urging the lid shaft into an operative position and the lid shaft urging the drive pin into the retracted position to close the switch and enable electric power to flow to the motor when the feed tube lid is in the closed position and the bowl and bowl lid are in the working position.

12. The kitchen appliance of claim 11 further comprising:
lid grooves associated with the bowl lid; and
lid ribs associated with the bowl, the lid grooves and lid ribs removably mounting the bowl lid to the bowl in the working position in a bayonet-type locking arrangement, the lid grooves and lid ribs extending along the bowl lid and bowl at an engagement angle greater than ten degrees.

13. The kitchen appliance of claim 12 wherein the engagement angle is between fifteen and thirty degrees.

14. The kitchen appliance of claim 11 wherein the feed tube lid includes a lid skirt, the lid skirt extending below the mouth of the feed tube when the feed tube lid is in the closed position.

15. A safety interlock for a kitchen appliance that renders the kitchen appliance inoperative when the safety interlock is in an open position, the safety interlock comprising:
an electric motor mounted within a housing of the kitchen appliance;
a switch mounted within the housing, power being able to be provided to the motor when the switch is closed;
a drive shaft driven by the motor and extending from the housing along a drive axis, the drive shaft including a drive sleeve and a drive pin, the drive pin being movably mounted to the drive sleeve, the drive pin being movable along the drive axis between an extended position and a retracted position, the switch being closed when the drive pin is in the retracted position;
a bowl removably mountable to the housing; and
a bowl lid removably mountable over a mouth of the bowl, the bowl lid including a lid shaft, the lid shaft contacting the drive pin and moving the drive pin to the retracted position when the lid shaft is in an operative position and the bowl and bowl lid are in a working position.

16. The safety interlock of claim 15 further comprising:
a feed tube extending from the bowl lid, the lid shaft movably mounted to the feed tube, the lid shaft being movable between the operative position and a safety position, the drive pin being biased to the extended position and the lid shaft being biased to the safety position.

17. The safety interlock of claim 16 further comprising:
a switch arm mounted to the drive pin adjacent the housing; and
a drive spring biasing the drive pin to the extended position, the drive spring being mounted in the housing between the electric motor and the switch arm.

18. The safety interlock of claim 16 further comprising:
a lid spring biasing the lid shaft toward the safety position, the lid spring being mounted between the bowl lid and the lid shaft.

19. The safety interlock of claim 15 further comprising:
a tool removably mountable to the drive shaft, the drive shaft driving the tool for processing foodstuff; and
a switch arm mounted to the drive pin within the housing, the switch arm moving with the drive pin when the drive pin moves between the retracted and extended positions, the switch arm being rotatably isolated from the drive pin.

20. The safety interlock of claim 19 wherein the switch arm includes a central ring that is mounted to the drive pin and an arm protrusion that extends radially outwardly from the central ring, the arm protrusion contacting and closing the switch when the drive pin is in the retracted position.

21. The safety interlock of claim 20 wherein the housing includes a retaining channel adjacent the switch arm, the arm protrusion extending into and being movable generally parallel to the drive axis within the retaining channel, the retaining channel blocking the switch arm from rotating relative to the housing when the drive shaft rotates.

22. The safety interlock of claim 21 wherein the switch arm is movable along the drive axis with the drive pin between the retracted and extended positions, the switch arm being movable within the retaining channel.

23. The safety interlock of claim 15 further comprising:
a tool removably mountable to the drive shaft, the drive sleeve being hollow and the drive pin being movably mounted within the drive sleeve, the drive sleeve including tool coupling teeth on an outside surface, the drive pin including drive shaft coupling teeth on an upper peripheral surface, the tool coupling teeth rotatably coupling the tool to the drive sleeve and the drive shaft coupling teeth rotatably coupling the drive pin to the drive sleeve.

24. A kitchen appliance with a safety interlock for processing foodstuff comprising:
a housing;
a motor mounted within the housing, the motor including a drive shaft that extends out of the housing, at least one portion of the drive shaft being movable along a drive axis;
a switch mounted in the housing;
a bowl removably mountable to the housing such that the drive shaft extends into the bowl in a working position; and
a lid removably mountable over a mouth of the bowl, a lid shaft actuating the at least one portion of the drive shaft to close the switch such that power is able to be provided to the motor when the bowl is in the working position and the lid is mounted over the bowl.

* * * * *